United States Patent [19]

Halling et al.

[11] Patent Number: 4,643,463
[45] Date of Patent: Feb. 17, 1987

[54] GIMBAL JOINT FOR PIPING SYSTEMS

[75] Inventors: Horace P. Halling; Se J. Oh, both of Laurel, Md.

[73] Assignee: Pressure Science Incorporated, Beltsville, Md.

[21] Appl. No.: 698,693

[22] Filed: Feb. 6, 1985

[51] Int. Cl.$^4$ ............................................. F16L 27/00
[52] U.S. Cl. ................................... 285/226; 285/265
[58] Field of Search ............... 285/265, 264, 226, 299, 285/300

[56] References Cited

U.S. PATENT DOCUMENTS

| | | |
|---|---|---|
| 656,667 | 8/1900 | Schmid . |
| 2,613,087 | 10/1952 | Alford . |
| 2,904,356 | 9/1959 | Love ...................................... 285/265 |
| 3,112,129 | 11/1963 | Willis et al. ........................... 285/226 |
| 3,219,365 | 11/1965 | Webb . |
| 4,165,107 | 8/1979 | Affa et al. . |
| 4,448,449 | 5/1984 | Halling et al. ........................ 285/263 |
| 4,480,857 | 11/1984 | Graves .................................. 285/265 |

FOREIGN PATENT DOCUMENTS

| | | | |
|---|---|---|---|
| 442914 | 12/1949 | Italy ...................................... 285/223 |
| 0227782 | 3/1925 | United Kingdom ................. 285/265 |
| 1278063 | 6/1972 | United Kingdom ................. 285/226 |
| 2029537 | 3/1980 | United Kingdom ................. 285/264 |
| 2101250 | 1/1983 | United Kingdom ................. 285/226 |
| 2107816 | 5/1983 | United Kingdom . |

Primary Examiner—Thomas F. Callaghan
Attorney, Agent, or Firm—Roylance, Abrams, Berdo & Goodman

[57] ABSTRACT

A flexible gimbal joint for pipes including an internal flexible seal interconnecting the pipes and an external gimbal ring which also provides secondary sealing. The joint includes spherical portions with mating sinusoidal free edges, the external ring and four trunnion pins, each pin coupled to the ring, two pins pivotally coupled to the first spherical portion and two other pins pivotally coupled to the second spherical portion. The inner surface of the ring is formed substantially as a spherical portion and has a diameter slightly greater than the outer surfaces of the first and second spherical portions. The ring surrounds these spherical portions, covering the gap between them, and thus acts as a secondary seal, while protecting the main internal seal. All axial loads on the joint are assumed by the spherical portions, the external ring and the trunnion pins, so the joint is easily flexed.

19 Claims, 6 Drawing Figures

GIMBAL JOINT FOR PIPING SYSTEMS

FIELD OF THE INVENTION

The invention relates to a flexible gimbal joint for pipes and has an internal flexible seal interconnecting the pipes and an external gimbal ring, which also provides secondary sealing.

BACKGROUND OF THE INVENTION

Flexible joints for tension piping systems are used extensively in aircraft duct systems, especially in compressor bleed air and anti-icing lines. While several different types of flexible joints are known, they have several disadvantages.

First, typical ball and socket joints, while providing flexibility, transmit the axial tension load due to pressure through a seat having a relatively large radius of curvature. Since the movement of resistance to angulation is proportional to the product of the axial force, the coefficient of friction and the radius of curvature of the bearing surface, the large seat radius results in a stiff joint. Stiff joints are undesirable since, while permitting angular rotation to accomodate flexure of the ducts, they impose high bending moments on the ducting and end connections, which may result in unacceptable stresses on engine ports, heat exchanges, airframe structures and the ducts themselves.

Flexible joints are also known which are formed via a gimbal having either an internal gimbal ring or an external gimbal ring. If the gimbal ring is located internally, the ring is subjected to large deflections, thereby requiring a heavier ring. In external gimbal ring joints, the ring does not cover and thus not protect the internal seal coupling the pipes and does not provide a secondary seal limiting leakage if the primary seal fails.

Examples of these prior art joints are disclosed in the following U.S. Pat. Nos. 656,667 to Schmid; 2,613,087 to Alford; 3,219,365 to Webb; and 4,165,107 to Affa et al. In addition, such a prior art joint is disclosed in U.K. Pat. No. 2,107,816 to Ward.

SUMMARY OF THE INVENTION

Accordingly, a primary object of the present invention is to provide a flexible gimbal joint for piping systems that does not require a heavy gimbal ring, and provides protection to the internal seal coupling the pipes.

Another object of the invention is to provide such a gimbal joint that has a secondary seal for limiting leakage upon failure of the primary seal.

Another object of the invention is to provide such a gimbal joint where the gimbal assembly assumes all of the axial loading in the joint and thereby provides a low bending moment and easier flexibility.

The foregoing objects are basically attained by providing a flexible gimbal joint for first and second pipes, the combination comprising: a gimbal assembly, coupled to the first and second pipes, for flexibly coupling the pipes together; and a flexible seal, coupled to the first and second pipes, for interconnecting the first and second pipes in a fluid-tight manner, the gimbal assembly comprising a first spherical portion rigidly coupled to the first pipe and surrounding a portion of the flexible seal, a second spherical portion rigidly coupled to the second pipe and surrounding another portion of the flexible seal, and a ring pivotally coupled to the first and second spherical portions, and having an inner surface in the form of a spherical portion having a diameter slightly greater than the diameters of the outer surfaces of the first and second spherical portions, the inner surface surrounding at least a portion of the outer surface of the first and second spherical portions.

Since the external gimbal ring is spaced from the spherical portions in the gimbal assembly, the gimbal assembly alone assumes the axial load in the joint, thereby providing a low bending moment. Since the gimbal ring is external to the spherical portions, the joint is easy to assemble and the ring can be relatively light.

Moreover, since the external gimbal ring surrounds the spherical portions, a secondary seal is provided that limits leakage of the fluid if the primary flexible seal fails.

The spherical portions can be formed with substantially sinusoidally-shaped free edges which mate and which limit the pivotal movement thereof upon engagement.

A first flexible seal is shown in FIGS. 1-5 where the seal is a substantially cylindrical bellows. A second embodiment of the seal is shown in FIG. 6 where it comprises an annular, resilient sealing member slidably engaged with a carbon-graphite annular sealing surface.

As used herein, the term "spherical portion" means a member formed as a portion of a sphere, and the term "mating" when characterizing the free ends of the spherical portions means an interleafing and not a full interengagement.

Other objects, advantages, and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 2 is a longitudinal sectional view in side elevation similar to that shown in FIG. 1 except that the joint has been flexed through an angle a;

DETAILED DESCRIPTION OF THE INVENTION

Figure 1:
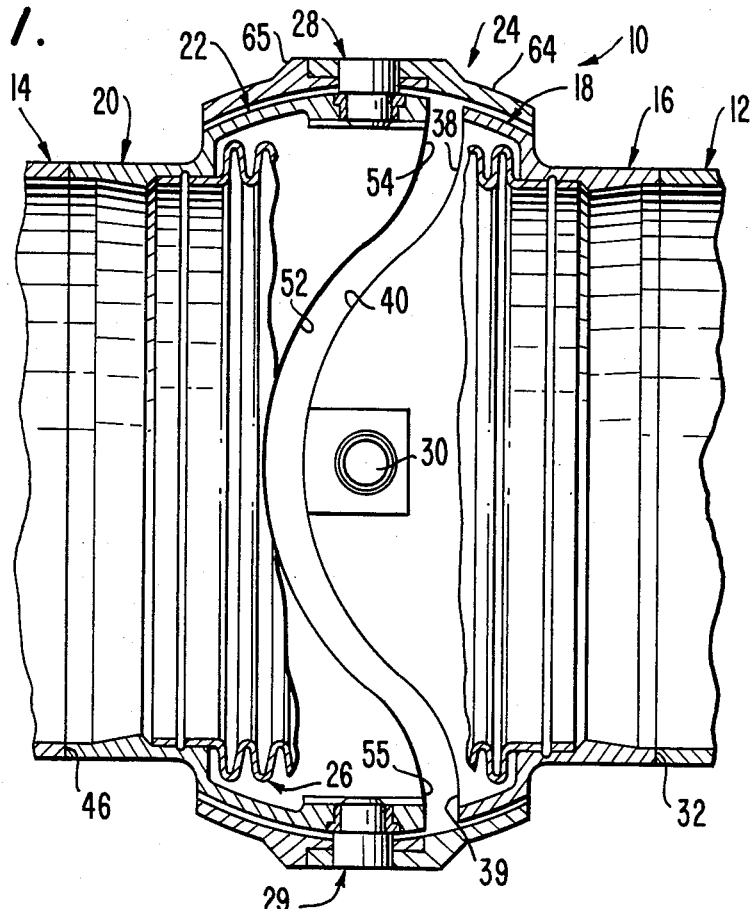
FIG. 1 is a longitudinal sectional view in elevation of the flexible gimbal joint in accordance with the invention, the joint being shown in an unflexed condition.

As seen in FIGS. 1-5, the flexible gimbal joint 10 in accordance with the invention universally couples first and second pipes 12 and 14 for rotation about two perpendicular axes, both transverse to the longitudinal axes of the tubes. The gimbal joint basically comprises a first tube 16 rigidly coupled to the first pipe, a first spherical portion 18 extending axially from the first tube, a second tube 20 rigidly coupled to the second pipe, a second spherical portion 22 extending axially from the second tube and into mating relationship with the first spherical portion, an exterior gimbal ring 24 surrounding the spherical portions, a flexible seal 26 rigidly coupled to and interconnecting the first and second pipes, and four trunnion pins 28–31 pivotally connecting the spherical portions to the exterior ring.

As seen in FIGS. 1–4, the first tube 16 is welded along annular weld line 32 to the first pipe and has rigidly extending therefrom the first spherical portion 18. The spherical portion has a central opening 34 coaxially aligned with the central longitudinal axis of the first tube and is substantially coincident therewith, the first spherical portion having an outer surface 35 in the form of a portion of a sphere whose central axis coincident with the longitudinal axis of the first tube. Similarly, the first spherical portion 18 has an inner surface 36 which is in the form of a portion of a sphere having its center line coincident with the central axis of the first tube. The first spherical portion has a sinuous free edge 37 that is substantially formed as a continuous sine wave having diametrically opposed and substantially mirror image recesses 38 and 39 and diametrically opposed and substantially mirror image flanges 40 and 41.

Figure 3:
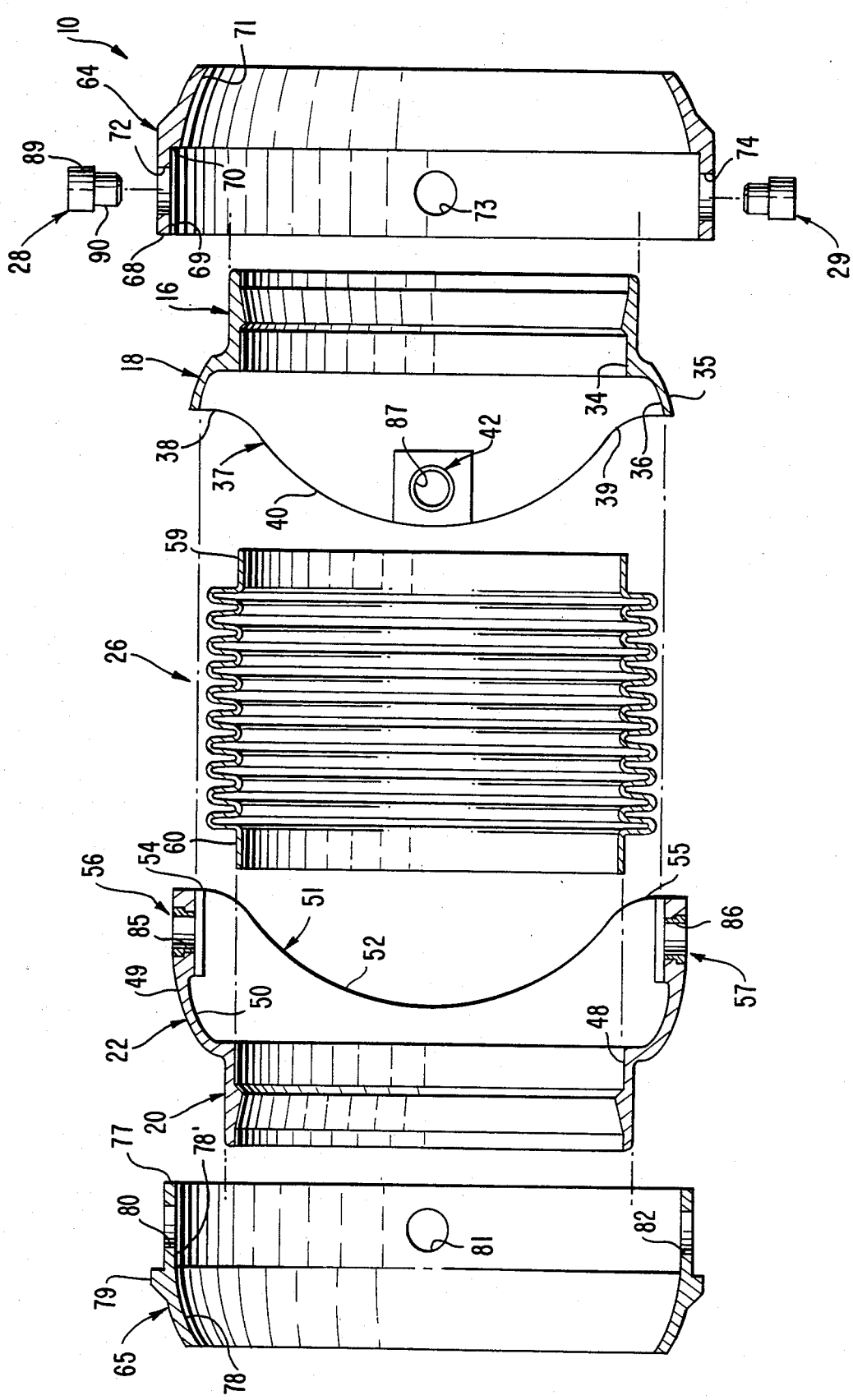
FIG. 3 is a reduced exploded longitudinal sectional view in side elevation of the flexible gimbal joint shown in FIG. 1.
Figure 4:
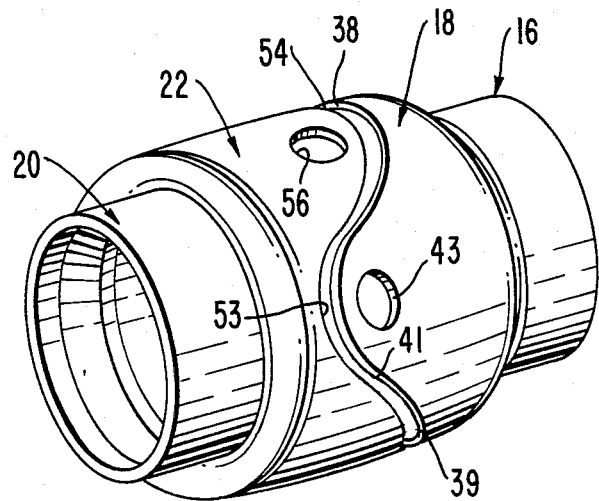
FIG. 4 is a reduced perspective view of the first and second spherical portions forming the flexible gimbal joint in a mating condition.

As seen in FIGS. 3 and 4, flange 40 has a transverse bore 42 therein while flange 41 has a transverse bore 43 therein, these bores being diametrically opposed and coaxial. This axis defines a pivot axis about which the first spherical portion 18 and first pipe 12 pivot in the gimbal joint as will be described in more detail hereinafter.

Figure 2:
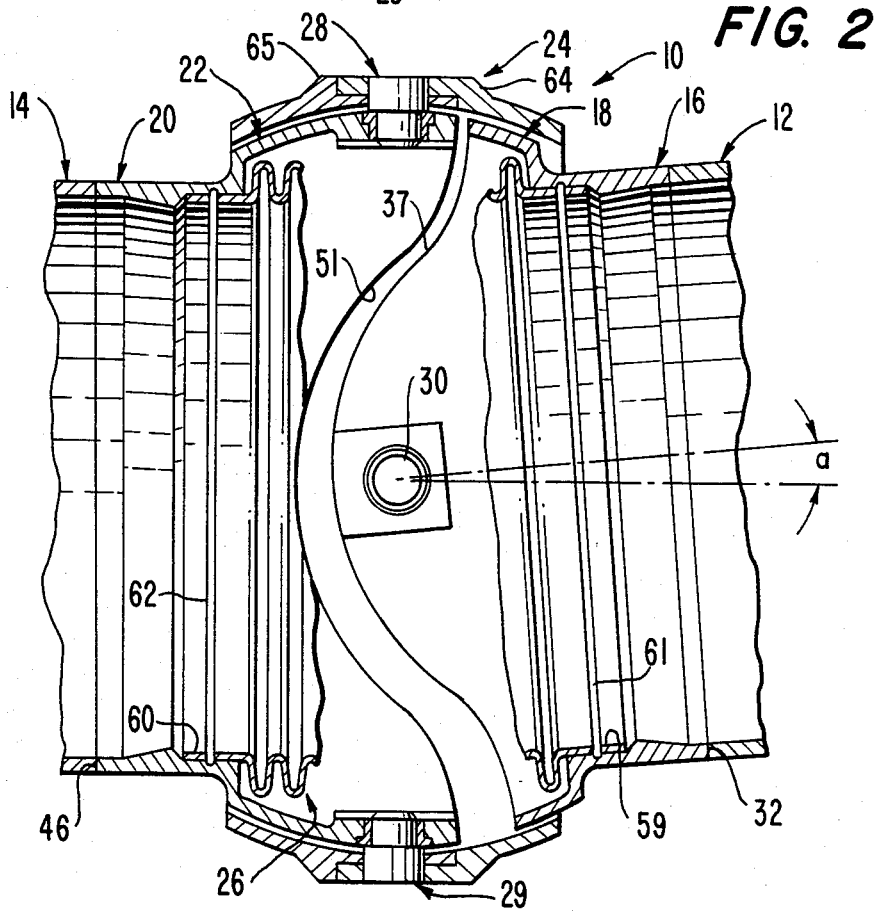

The second tube 20 as seen in FIGS. 1 and 2 is rigidly coupled to the first pipe along circular weld line 46 and has the second spherical portion 22 rigidly extending integrally therefrom in the axial direction. The combination of the second tube and second spherical portion is substantially identical to the combination of the first tube and the first spherical portion, but they are rotated through 90° around the longitudinal axis thereof. Thus, as seen in FIG. 3, the second spherical portion 22 has a central opening 48 coaxial with the first tube, an outer surface 49 and an inner surface 50, both of which have center lines that are coaxial with the central axis of the second tube and are portions of a sphere. The second spherical portion also has a free edge 51 that is sinuous and approximates a continuous sine wave including a pair of diametrically opposed recesses 52 and 53 and a pair of diametrically opposed flanges 54 and 55, the flanges respectively having transverse and coaxial bores 56 and 57 therein. The axis of these bores defines a second pivot axis about which the second spherical portion 22 and second pipe 14 pivot in the gimbal joint, this axis being perpendicular to and intersecting the axis of bores 42 and 43 in the first spherical portion. The intersection of these axes is at the center points of the spherical portions.

As seen in FIGS. 1, 2, and 4, the free edges 37 and 51 of the first and second spherical portions 18 and 22 mate to the extent that the two flanges on the first spherical portion are received in the two recesses in the second spherical portion and the two flanges on the second spherical portion are received in the two recesses on the first spherical portion, although the free edges thereof do not engage each other in the unflexed condition.

As seen in FIGS. 1–3, the flexible seal 26 is in the form of a substantially cylindrical bellows having opposite end annular flanges 59 and 60 which are rigidly coupled via respective annular weld lines 61 and 62 to the inner surfaces of the first and second tubes. Thus, since the first and second tubes are rigidly coupled to the first and second pipes, the flexible bellows seal 26 is also rigidly coupled to these pipes, interconnects them and providing a fluid-tight seal therebetween.

The external gimbal ring 24 as seen in FIGS. 1–3 is circular and comprised of a first half ring member 64 and a second half ring member 65, these ring members interengaging in an interference fit to form the ring 24, as seen in FIGS. 1 and 2.

As seen in FIG. 3, the first half ring member 64 has an annular shoulder 68 at its free axial end, an inwardly facing cylindrical bore 69 extending axially inwardly from the annular shoulder, a second annular shoulder 70 extending radially inwardly from the cylindrical bore, and an inner surface 71 in the form of a spherical portion. This spherical portion has a center line that is coincident with the longitudinal axes of the first spherical portion 18, first tube 16 and first pipe 12 in the unflexed position shown in FIG. 1. In addition, the diameter of this inner surface 71 is slightly greater than the diameter of the outer surface 35 of the first spherical portion 18, the clearance therebetween being about 0.001 to about 0.005 inch. This clearance is substantially uniform and is in itself a portion of a sphere.

Figure 5:
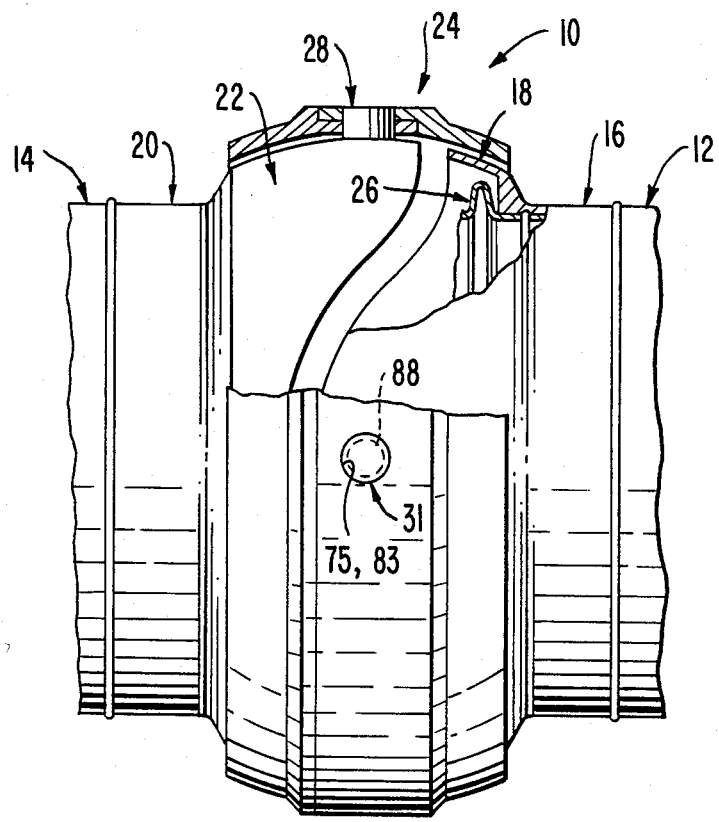
FIG. 5 is a reduced side elevational view in partial section of the flexible gimbal joint shown in FIG. 1.

As seen in FIGS. 3 and 5, the first half ring member 64 has four equally circumferentially spaced transverse bores 72–75 formed radially therethrough from the cylindrical bore 69 and having the same diameter.

As seen in FIG. 3, the second half ring member 65 is similar to the first half ring member and comprises an annular shoulder 77 at its free axial end, an inner cylindrical surface 78' extending axially inwardly from the annular shoulder, an inner surface 78 extending from surface 78' and an annular flange 79 on its exterior. The inner surface 78 is in the form of a portion of a sphere and has a diameter substantially equal to the diameter of the inner surface 71 in the first half ring member. This inner surface 78, as well as surface 78', also has a center line substantially coincident with the center line of the second tube 20 and the second pipe 14. Its diameter is also about 0.001 to about 0.005 inch greater than the outer surface of the second spherical portion 22. Four equally circumferentially spaced transverse bores 80–83 are formed in the second half ring member so as to align with the four bores formed in the first half ring member, these bores having the same diameter. The center point of the ring's inner spherical portions is the same and is also the same as the center point for spherical portions 18 and 22.

As seen in FIGS. 1–3, four bushings 85–88 are rigidly received respectively in bores 42 and 43 in the first spherical portion 18 and in bores 56 and 57 in the second spherical portion 22.

The four trunnion pins 28–31 couple the gimbal joint together. Thus, the first trunnion pin 28 is received in aligned bores 72 and 80 in the first and second half ring members and is pivotally received in bushing 85 in bore 56 in the second spherical portion. This trunnion pin, as well as the other three, have an enlarged head 89 which is substantially rigidly received in the bores in the ring 24. In addition, these enlarged heads can be welded to the ring. The lower part or stem 90 of the trunnion pin 28 is smaller than the enlarged head and is received in the bushing to allow pivotal movement of the spherical portion carrying the bushing relative to the pin and thus the ring 24.

The second trunnion pin 29 is rigidly received in bores 74 and 82 in the first and second half ring members and pivotally received in bushing 86 in the second spherical portion 22. The third trunnion pin 30 is rigidly received in bores 73 and 81 in the first and second half ring members and pivotally received in bushing 87 in the first spherical portion 18. Likewise, the fourth trunnion pin 31 is rigidly received in bores 75 and 83 in the first and second half ring members and pivotally received in bushing 88 in the first spherical portion 18.

The first and second trunnion pins 28 and 29 are coaxially aligned and define a pivot axis about which the first spherical portion, first tube and first pipe pivot, as part of the gimbal action of the joint. In addition, the third and fourth trunnion pins 30 and 31 form a second axis perpendicular to the first about which the second spherical portion, second tube and second pipe pivot. These axes about which the two spherical portions pivot are perpendicular and coplanar and intersect at the center of the ring and spherical portions.

As indicated by comparing FIGS. 3 and 1, assembly of the gimbal joint 10 is relatively simple. Thus, the flexible bellows seal 26 is welded to the first and second tubes and the recesses and flanges on the spherical portions are placed in a mating position, although their free edges do not touch. Then, the first and second half ring members 64 and 65 are moved axially towards one another until they mate over the series of bores in the spherical portions and are rotated until the bores in these ring members align. Next, the four trunnion pins are maneuvered through the ring members and into the bores in the spherical portions. The trunnion pins are welded to the ring member as necessary. Likewise, the two mating first and second half ring members can be welded together. Finally, the tubes are welded, or otherwise connected, to the pipes.

In this assembled position as seen in FIG. 1, the ring 24 formed of the first and second half ring members 64 and 65 has an axial extent substantially equal to the combined axial extents of the spherical portions and surrounds them. Thus, the ring protects the flexible seal 26 which otherwise might be exposed through the sinusoidal space between the mating free edges of the spherical portions. Moreover, the clearance between the inner surface of the ring and the outer surfaces of the spherical portions allows all of the axial load on the pipes to be assumed by the trunnion pins, while this small clearance provides a secondary seal that limits leakage of the fluid in the pipes if the primary flexible seal 26 were to fail.

Since the areas of the ring 24 adjacent the four trunnion pins tends to experience the greatest material deflection during operation of the joint, it is possible to construct the ring 24 so that it is not perfectly circular and thus allow a more close fit around the spherical portions and allow the ring to act as an aligning spring for the spherical portions. This can be accomplished by moving the areas of the ring adjacent the bores inwardly or by making the trunnion pin heads longer and thus bias the bore areas outwardly.

As indicated in FIG. 2, when the first pipe 12 flexes relative to the second pipe 14, adjacent flanges and recesses on the free edges 37 and 51 on the spherical portions can engage one another. Thus, a maximum flexing of one pipe relative to the other is controlled when these free edges engage each other through the pivotal movement therebetween.

EMBODIMENT OF FIG. 6

Figure 6:
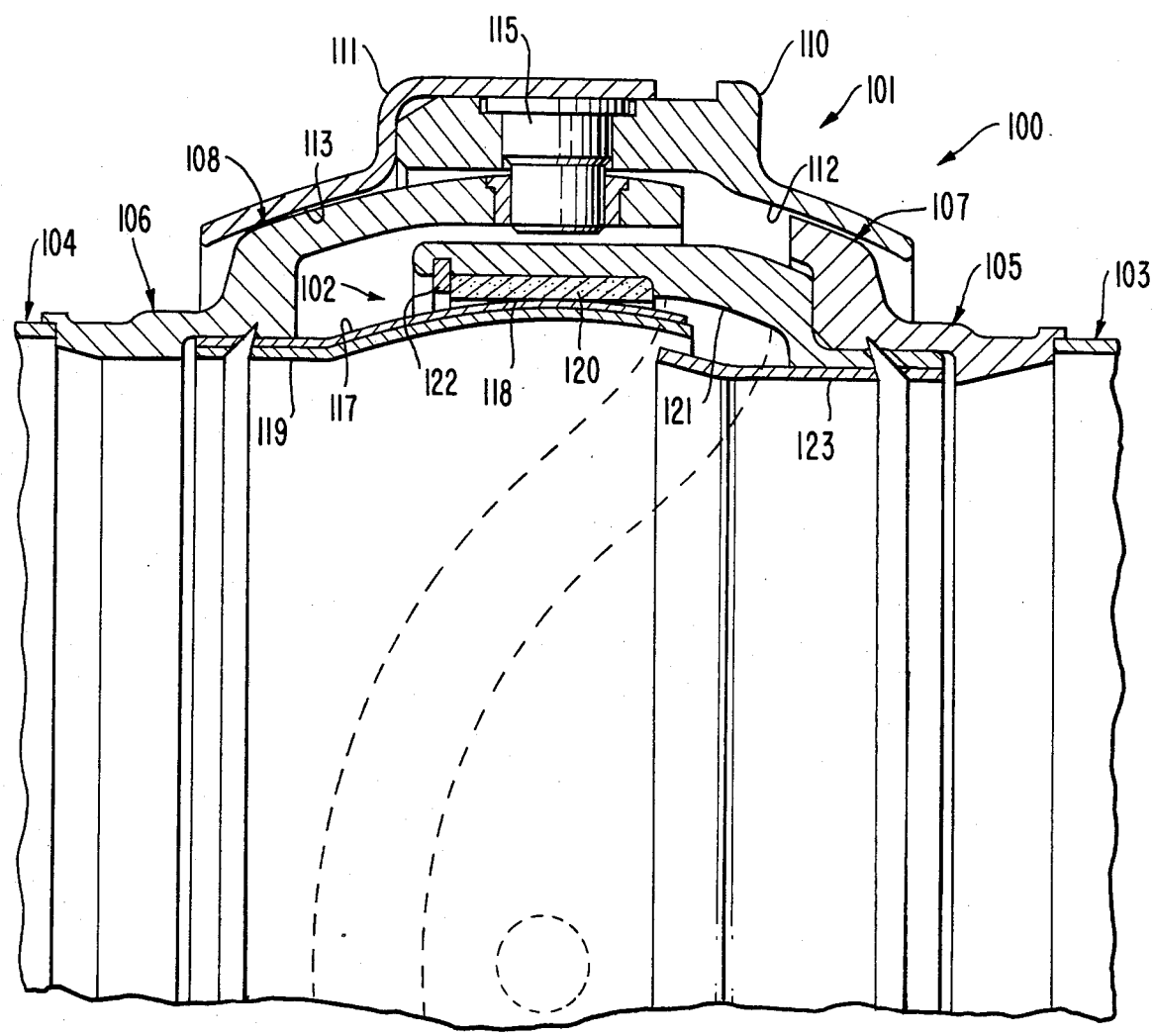
FIG. 6 is a fragmentary longitudinal sectional view in side elevation of a modified flexible gimbal joint in accordance with the invention, the seal comprising a resilient annular sealing member slidably engaged in a carbon-graphite annular sealing surface.

Turning now to FIG. 6, a slightly modified flexible gimbal joint 100 is shown which is basically the same as joint 10 discussed above and shown in FIGS. 1-5 except that the construction of the external gimbal ring 101 and the flexible seal 102 are different.

In this embodiment, there is a first pipe 103 and a second pipe 104, a first tube 105 and a second tube 106, and a first spherical portion 107 and a second spherical portion 108. The tubes and spherical portions are substantially the same as described above regarding the embodiment of FIGS. 1-5.

The external gimbal ring 101 comprises a first half ring member 110 and a second half ring member 111 which are mated together in an interference fit. The first half ring member 110 has an inwardly facing inner surface 112 that is in the form of a portion of a sphere and likewise the second half ring member has an inner surface 113 in the form of a portion of a sphere, each of these inner surfaces, respectively, having a diameter about 0.001 to about 0.005 inch greater than the outer surface of the first and second spherical portions 107 and 108. In this embodiment, only the first half ring member 110 has trunnion pins rigidly received therein (only pin 115 being shown) and pivotally coupled to a suitable bore and bushing in the second spherical portion 108. Since the first half ring member 110 is thicker where it receives the trunnion pin 115 than the two half ring members in the embodiment of FIGS. 1-5, the ring 101 is generally stronger.

The flexible seal 102 rather than comprising a bellows comprises instead an annular sealing member 117 that is formed of metal and is resilient, and an annular sealing surface 118 along which the sealing member can slide and is inserted via an interference fit. This flexible sealing arrangement is disclosed in U.S. Pat. No. 4,448,449 to Halling et al, the disclosure of which is hereby incorporated by reference.

The annular sealing member 117 has a curved outer surface along the axial direction and is supported thereneath via a similarly shaped annular liner 119 which is suitably welded along with the annular sealing member to the second tube 106. While not specifically shown for reasons of clarity, there is a slight space between the inner annular surface of the sealing member 117 and the outer annular surface of the liner 119 in order to allow inward elastic deformation of the resilient sealing member as it is inserted into the annular sealing surface 118.

This surface 118 is formed by a cylindrical ring, preferably formed of carbon-graphite, although it could also be formed of metal. This ring 120 is held longitudinally in place in a recess in an annular support member 121 via a split locking ring 122, the support member 121 being in turn rigidly coupled to the first tube 105 via a suitable circular weld line. In addition, an annular flow liner 123 can be welded to the support member 121 to provide a smoother flow of the fluid in the piping system.

While two advantageous embodiments have been chosen to illustrate the invention, it will be understood by those skilled in the art that various changes and modifications can be made therein without departing from the scope of the invention as defined in the appended claims.

What is claimed is:

1. A flexible gimbal joint for first and second pipes, the combination comprising:
   gimbal means, coupled to the first and second pipes, for flexibly coupling the pipes together; and
   flexible means, coupled to the first and second pipes, for interconnecting the first and second pipes in a fluid-tight manner,
   said gimbal means comprising
   a first spherical portion rigidly coupled to the first pipe, having an outer surface and a free end, and surrounding a portion of said flexible means,
   a second spherical portion rigidly coupled to the second pipe, having an outer surface and a free end, and surrounding another portion of said flexible means,
   a ring,
   means for pivotally coupling said first and second spherical portions to said ring with said free ends spaced apart by a circumferentially continuous gap,
   said ring having an inner surface substantially in the form of a spherical portion having a diameter slightly greater than the diameters of the outer surfaces of said first and second spherical portions and being out of contact with said outer surfaces, said innner surface surrounding at least a portion of said outer surfaces of said first and second spherical portions and spanning said gap,
   said outer surfaces of said first and second spherical portions having substantially equal diameters.

2. A flexible gimbal joint according to claim 1, wherein
   said ring inner surface surrounds substantially all of said outer surfaces of said first and second spherical portions.

3. A flexible gimbal joint according to claim 1, wherein
   said ring comprises first and second interengaging halves.

4. A flexible gimbal joint according to claim 1, wherein
   said means for pivotally coupling comprises four trunnion pins equally circumferentially spaced along said ring, with each pin rigidly coupled to said ring, two pins pivotally coupled to said first spherical portion and two other pins pivotally coupled to said second spherical portion.

5. A flexible gimbal joint according to claim 1, wherein
   said first spherical portion has a substantially sinusoidal-shaped free end including two recesses and two flanges,
   said second spherical portion has a substantially sinusoidal-shaped free end including two recesses and two flanges,
   the two flanges on said first spherical portion being received in the two recesses on said second spherical portion, and
   the two flanges on said second spherical portion being received in the two recesses on said first spherical portion.

6. A flexible gimbal joint according to claim 1, wherein
   said flexible means comprises a substantially cylindrical bellows.

7. A flexible gimbal joint according to claim 1, wherein
   said flexible means comprises
   an annular resilient metallic sealing ring having a curved outer surface, and
   an annular inwardly facing sealing surface in slidable engagement with said curved outer surface.

8. A flexible gimbal joint according to claim 7, wherein
   said sealing surface is formed of carbon-graphite material.

9. A flexible gimbal joint according to claim 1, wherein
   said inner surface diameter is about 0.001–0.005 inch greater than the diameters of the outer surfaces of said first and second spherical portions.

10. A flexible gimbal joint for first and second pipes, the combination comprising:
    a first tube rigidly coupled to the first pipe;
    a first spherical portion rigidly coupled to said first tube, having a central aperture therein aligned with said first tube and having first and second diametrically opposed flanges thereon, each flange having a bore;
    a second tube rigidly coupled to the second pipe;
    a second spherical portion rigidly coupled to said second tube, having a central aperture therein aligned with said second tube and having third and fourth diametrically opposed flanges thereon, each flange having a bore;
    flexible means, coupled to said first and second tubes and located inside said first and second spherical portions, for interconnecting said first and second tubes in a fluid-tight manner;
    said first and second spherical portions having free ends spaced apart by a circumferentially continuous gap;
    a ring having first, second, third and fourth equally circumferential spaced apertures and surrounding said flanges on each of said first and second spherical portions;
    a first trunnion pin received in said first aperture in said ring and pivotally received in said bore in said first flange;
    a second trunnion pin received in said second aperture in said ring and pivotally received in said bore in said second flange;
    a third trunnion pin received in said third aperture in said ring and pivotally received in said bore in said third flange; and
    a fourth trunnion pin received in said fourth aperture in said ring and pivotally received in said bore in said fourth flange,
    said first and second spherical portions having outer surfaces with substantially equal diameters,
    said ring having an inner surface substantially in the form of a spherical portion and spanning said gap, the diameter of said inner surface being slightly greater than the diameters of the outer surfaces of said first and second spherical portions, said inner surface being out of contact with said outer surfaces.

11. A flexible gimbal joint according to claim 10, wherein
    said ring surrounds said flexible means.

12. A flexible gimbal joint according to claim 10, wherein
    said ring surrounds said first and second spherical portions.

13. A flexible gimbal joint according to claim 10, wherein said ring comprises first and second interengaging halves.

14. A flexible gimbal joint according to claim 10, wherein
said first and second spherical portions have mating substantially sinusoidal-shaped free ends.

15. A flexible gimbal joint according to claim 10, wherein
said ring comprises first and second interengaging halves, said first, second, third and fourth trunnion pins connecting said interengaging halves together.

16. A flexible gimbal joint according to claim 10, wherein
said inner surface diameter is about 0.001–0.005 inch greater than the diameters of the outer surfaces of said first and second spherical portions.

17. A flexible gimbal joint for first and second pipes, the combination comprising:
gimbal means, coupled to the first and second pipes, for flexibly coupling the pipes together; and
flexible means, coupled to the first and second pipes, for interconnecting the first and second pipes in a fluid-tight manner,
said gimbal means comprising
a first spherical portion rigidly coupled to the first pipe, having an outer surface and a free end, and surrounding a portion of said flexible means,
a second spherical portion rigidly coupled to the second pipe, having an outer surface and a free end, and surrounding another portion of said flexible means,
a ring, and
means for pivotally coupling said first and second spherical portions to said ring with said free ends spaced apart by a circumferentially continuous gap,
said ring having an inner surface substantially in the form of a spherical portion having a diameter slightly greater than the diameters of the outer surfaces of said first and second spherical portions and being out of contact with said outer surfaces, said inner surface surrounding at least a portion of said outer surfaces of said first and second spherical portions,
said outer surfaces of said first and second spherical portions having substantially equal diameters,
said means for pivotally coupling comprising four trunnion pins equally circumferentially spaced along said ring, with each pin rigidly coupled to said ring, two pins pivotally coupled to said first spherical portion, and two other pins pivotally coupled to said second spherical portion,
said ring comprising first and second interengaging halves, said four trunnion pins coupling said interengaging halves together.

18. A flexible gimbal joint according to claim 17, wherein
said first spherical portion has a substantially sinusoidal-shaped free end including two recesses and two flanges,
said second spherical portion has a substantially sinusoidal-shaped free end including two recesses and two flanges,
the two flanges on said first spherical portion being received in the two recesses on said second spherical portion, and
the two flanges on said second spherical portion being received in the two recesses on said first spherical portion.

19. A flexible gimbal joint for first and second pipes, the combination comprising:
gimbal means, coupled to the first and second pipes, for flexibly coupling the pipes together; and
flexible means, coupled to the first and second pipes, for interconnecting the first and second pipes in a fluid-tight manner,
said gimbal means comprising
a first annular portion rigidly coupled to the first pipe, having an outer surface and a free end, and surrounding a portion of said flexible means,
a second annular portion rigidly coupled to the second pipe, having an outer surface and a free end, and surrounding another portion of said flexible means,
a ring,
means for pivotally coupling said first and second portions to said ring with said free ends spaced apart by a circumferentially continuous gap,
said ring having an annular inner surface having a diameter slightly greater than the diameters of the outer surfaces of said first and second portions and being out of contact with said outer surfaces, said inner surface surrounding at least a portion of said outer surfaces of said first and second portions and spanning said gap,
said outer surfaces of said first and second portions having substantially equal diameters.

* * * * *